United States Patent
Lau (10) Patent No.: US 7,663,873 B2
(45) Date of Patent: Feb. 16, 2010

(54) FIXING MECHANISM FOR COMPONENT

(75) Inventor: Sam Waisum Lau, Irvine, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/556,194

(22) Filed: Nov. 3, 2006

(65) Prior Publication Data

US 2007/0297127 A1   Dec. 27, 2007

(30) Foreign Application Priority Data

Jun. 21, 2006   (CN) .................. 2006 1 0061241

(51) Int. Cl.
*H05K 7/00* (2006.01)
*A47B 81/00* (2006.01)
*A47F 7/00* (2006.01)

(52) U.S. Cl. .............. 361/679.39; 312/223.2; 206/701

(58) Field of Classification Search .......... 361/685, 361/724–727, 679.01–679.45, 679.55–679.59; 312/223.1, 223.2; 211/26
See application file for complete search history.

(56) References Cited

U.S. PATENT DOCUMENTS 6,654,240 B1   11/2003  Tseng et al.
2003/0058612 A1 *  3/2003  Liu et al. .................. 361/685
2005/0052841 A1 *  3/2005  Chen et al. ................ 361/685
2005/0117289 A1   6/2005  Han

FOREIGN PATENT DOCUMENTS

CN   2673042 Y   1/2005

* cited by examiner

*Primary Examiner*—Jayprakash N Gandhi
*Assistant Examiner*—Nidhi Desai
(74) *Attorney, Agent, or Firm*—Wei Te Chung (57) ABSTRACT

An exemplary fixing mechanism for a data storage device includes a case, and a latch member. The data storage device includes two pairs of guiding pins attached to sidewalls thereof. The case includes a first panel, and a second panel. The first panel includes an opening defined therein, and a first plate perpendicularly extending from an edge of the opening. The second panel includes a bracket to hold a component other than the data storage device therein. The bracket includes a wall parallel to the first plate. A pair of first sliding channels is defined in the wall and a second sliding channel is defined in the first plate, for slidably receiving the guiding pins therein. The latch member is attached to the first plate and includes a resilient arm. A positioning space is defined in the resilient member to hold the corresponding guiding pin therein.

5 Claims, 7 Drawing Sheets

FIXING MECHANISM FOR COMPONENT

BACKGROUND OF THE INVENTION

1. Field of the Invention

The present invention relates to a fixing mechanism, and more particularly to a fixing mechanism for fixing a component in an electronic apparatus.

2. Description of Prior Art

Generally speaking, when a computer is assembled, a drive bracket is mounted in a computer enclosure, and then data storage devices are fixed to the drive bracket. The data storage devices include various combinations of hard disk drives (HDDs), floppy disk drives (FDDs), and compact disk-read only memory (CD-ROM) drives.

Conventionally, a data storage device is attached to a drive bracket of a computer by bolts. The data storage device may be a hard disk drive, a floppy disk drive, or a CD-ROM drive. However, attachment by bolts is complicated and time-consuming. Furthermore, attachment by such means requires extra work space be available inside the computer enclosure. This requirement runs counter to the trend toward miniaturization in the computer industry.

What is desired, therefore, is a mounting apparatus which readily allows securely installing or removing a storage device to or from a computer enclosure.

SUMMARY OF THE INVENTION

An exemplary fixing mechanism for a data storage device includes a case and a latch member. The data storage device includes two pairs of guiding pins attached to sidewalls thereof. The case includes a first panel, and a second panel. The first panel includes an opening defined therein, and a first plate perpendicularly extending from an edge of the opening. The second panel includes a bracket to hold a component other than the data storage device therein. The bracket includes a wall parallel to the first plate. A pair of first sliding channels is defined in the wall and a second sliding channel is defined in the first plate, for slidably receiving the guiding pins therein. The latch member is attached to the first plate and includes a resilient arm. A positioning space is defined in the resilient member to hold the corresponding guiding pin therein.

Other advantages and novel features will become more apparent from the following detailed description of a preferred embodiment when taken in conjunction with the accompanying drawings, in which:

DETAILED DESCRIPTION OF THE INVENTION

Figure 1:
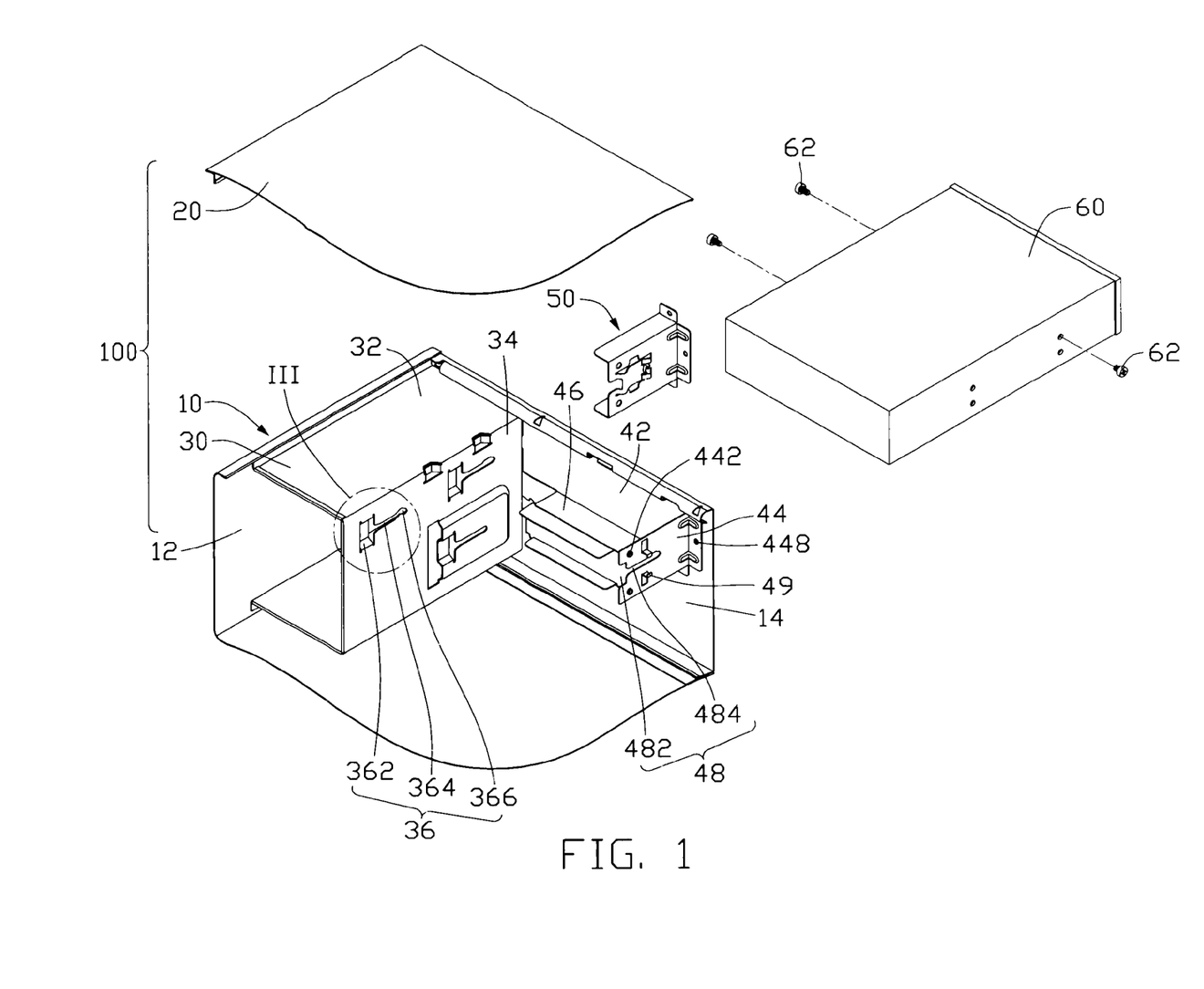
FIG. 1 is an exploded, isometric view of a fixing mechanism in accordance with a preferred embodiment of the present invention together with a data storage device with guiding pins to be fixed in place, the fixing mechanism including a chassis, a cover, and a latch member.

Referring to FIG. 1, a fixing mechanism of an electronic device like a desktop computer in accordance with a preferred embodiment of the present invention is provided to fix components in the electronic device. The fixing mechanism includes a chassis 100, and a latch member 50 attached to the chassis 100 for fixing a data storage device 60 in the chassis 100.

Figure 2:
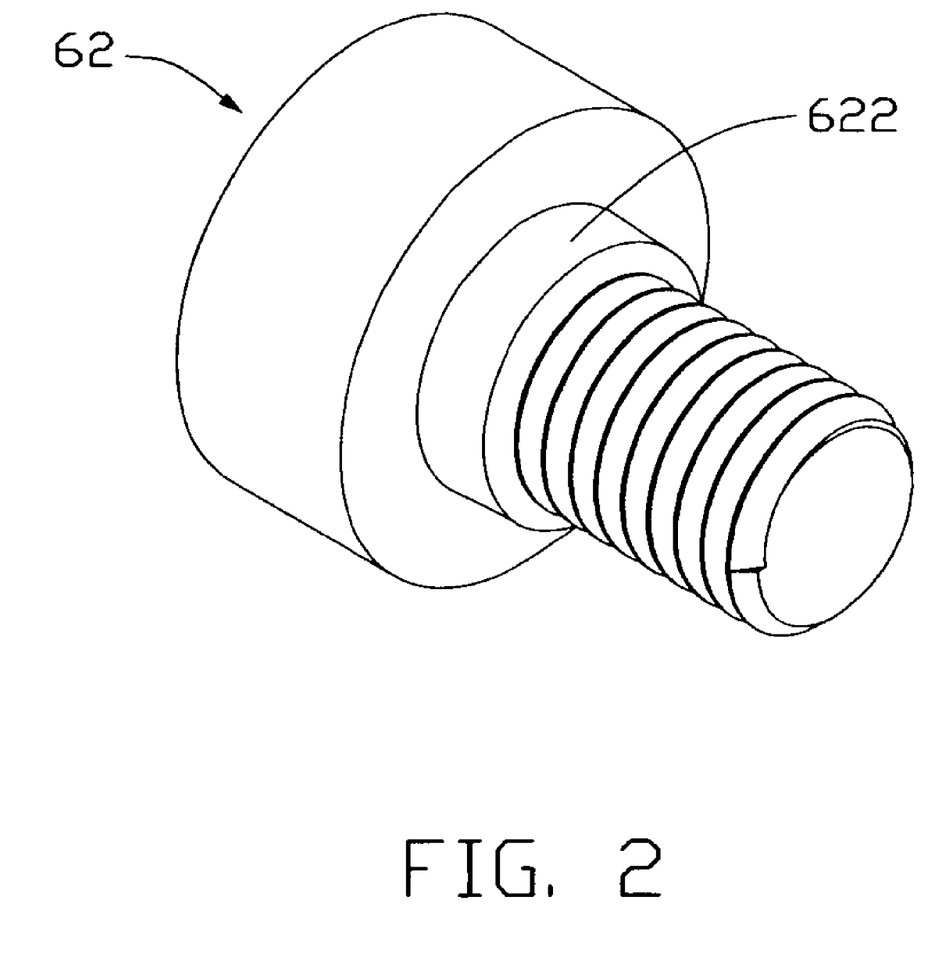
FIG. 2 is an enlarged, isometric view of one of the guiding pins of FIG. 1.

Referring also to FIG. 2, the data storage device 60 includes two pairs of guiding members 62 attached to two opposite sidewalls thereof, respectively. In this preferred embodiment, the guiding members 62 are thumb screws each with a neck portion 622 located between a head and a threaded shank thereof.

The chassis 100 includes a case 10, and a cover 20 covering the case 10. The case 10 includes a first panel 14, and a second panel 12 perpendicular to the second panel 12.

Figure 3:
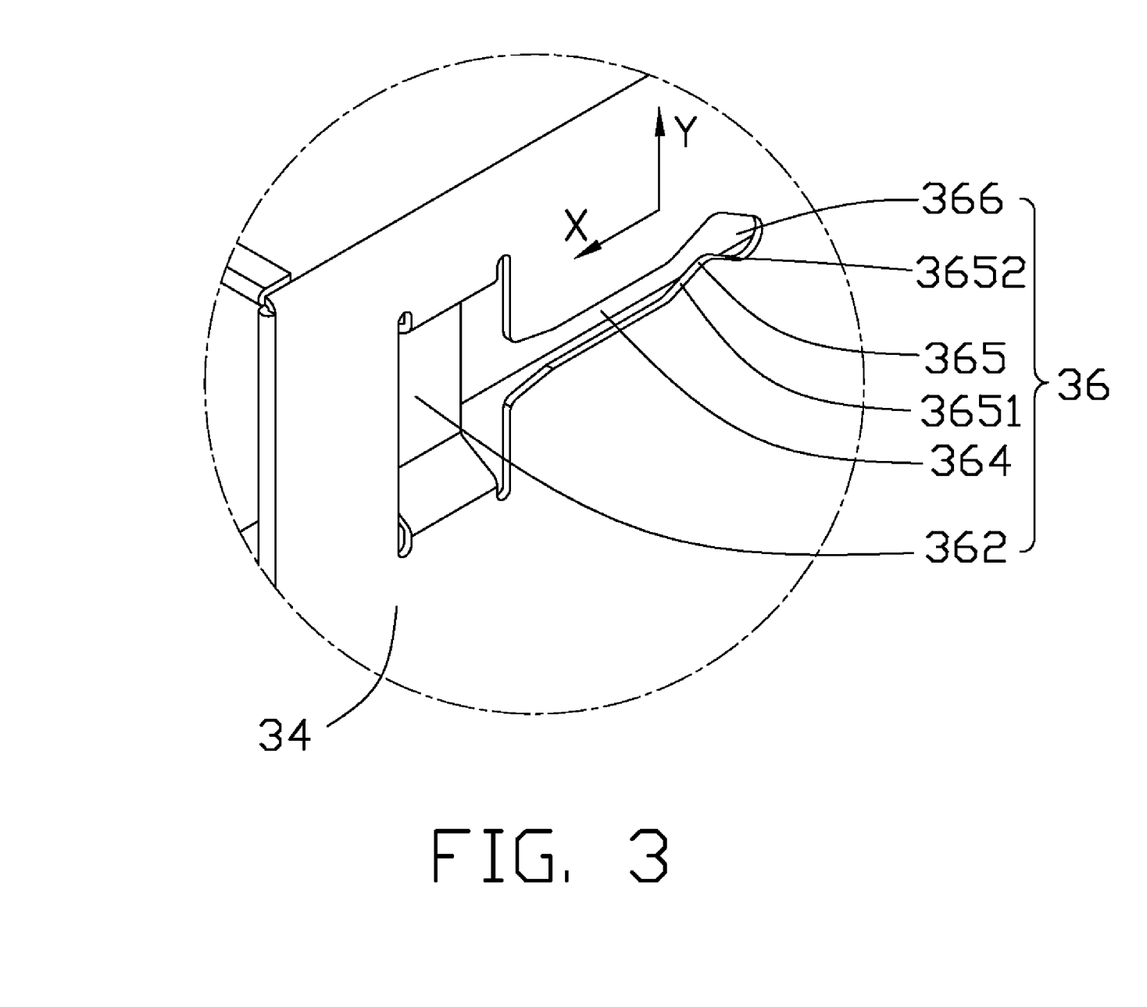
FIG. 3 is an enlarged view of a circled portion III of the chassis of FIG. 1.

Referring also to FIG. 3, the second panel 12 includes a bracket 30 attached thereto with some conventional fasteners. The bracket 30 is for holding another component other than the data storage device 60 therein. The bracket 30 includes a case wall 34 parallel to the second panel 12, and a pair of sidewalls 32 perpendicular to the case wall 34. A pair of first sliding channels 36 is defined in the case wall 34, in a horizontal alignment. Each of the first sliding channels 36 includes an entry 362, a straightaway 364, and a retention portion 366, configured in turn. The entry 362 is generally a rectangular through hole. The straightaway 364 is communicated with a rear end of the corresponding entry 362. The retention portion 366 is communicated with a rear end of the corresponding straightaway 364. A projection 365 is formed between the retention portion 366 and the straightaway 364 of a front first sliding channel 36 and includes a first slanting edge 3651 slantingly extending from a lower side of the straightway 364, and a second slanting edge 3652 angled with the first slanting edge 3652 and connecting with a lower side of the retention portion 366.

The first panel 14 includes an opening 42 defined therein, adjacent the bracket 30, a first plate 44 extending vertically and inward from a right edge of the opening 42, and a second plate 46 extending horizontally and inward from a bottom edge of the opening 42. The first plate 44 includes a second sliding channel 48 defined therein, corresponding to a rear first sliding channel 36. The second sliding channel 48 includes an entry 482, and a straightaway 484 communicated with a rear end of the entry 482. A pair of opposite hooks 49 extends from the first plate 44, beside the second sliding channel 48. A pair of fixing protrusions 442 extends from a front portion of the first plate 44, beside the second sliding channel 48. A plurality of fixing protrusions 448 also extends from the first panel 14 of the case 10, around the opening 42.

Figure 4:
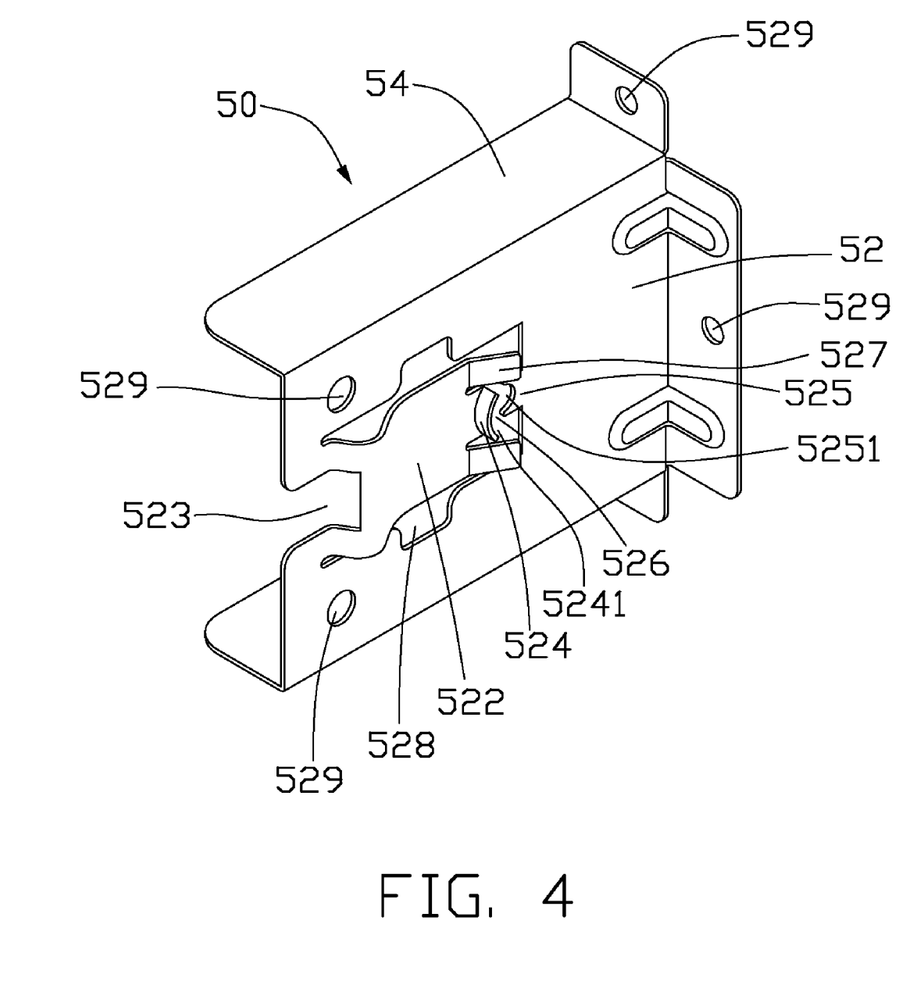
FIG. 4 is an enlarged, isometric view of the latch member of FIG. 1.

Referring also to FIG. 4, the latch member 50 includes a board 52, and a pair of flanges 54 perpendicularly extending from an upper edge and a bottom edge of the board 52 respectively. The board 52 includes a cantilever resilient arm 522 stamped outward from a front portion thereof toward the board 52. A cutout 523 is defined in a front portion of the board 52 and extends to a front portion of the resilient arm 522. A pair of locating slots 528 is defined in the board 52, in upper and lower sides of the resilient arm 522 respectively. The resilient arm 522 includes a semicircular cutout 5241 defined in a free distal end thereof. A semicircular protrusion 524 extends from the resilient arm 522 along an arced edge of the semicircular cutout 5241. An extension tab 525 defining a curved cutout 5251 extends from the board 52, toward the semicircular protrusion 524. The semicircular cutout 5241 and the curved cutout 5251 of the extension tab 525 cooperatively define a positioning space 526 therebetween to encircle the corresponding guiding pin 62 of the data storage device 60 therein. A pair of handling tabs 527 extends slantingly from the distal end of the resilient arm 522, beside the semicircular protrusion 524 and the semicircular cutout 5241. A plurality of apertures 529 is defined in mounting flanges of a rear end of the latch member 50, and the front portion of the board 52.

Figure 5:
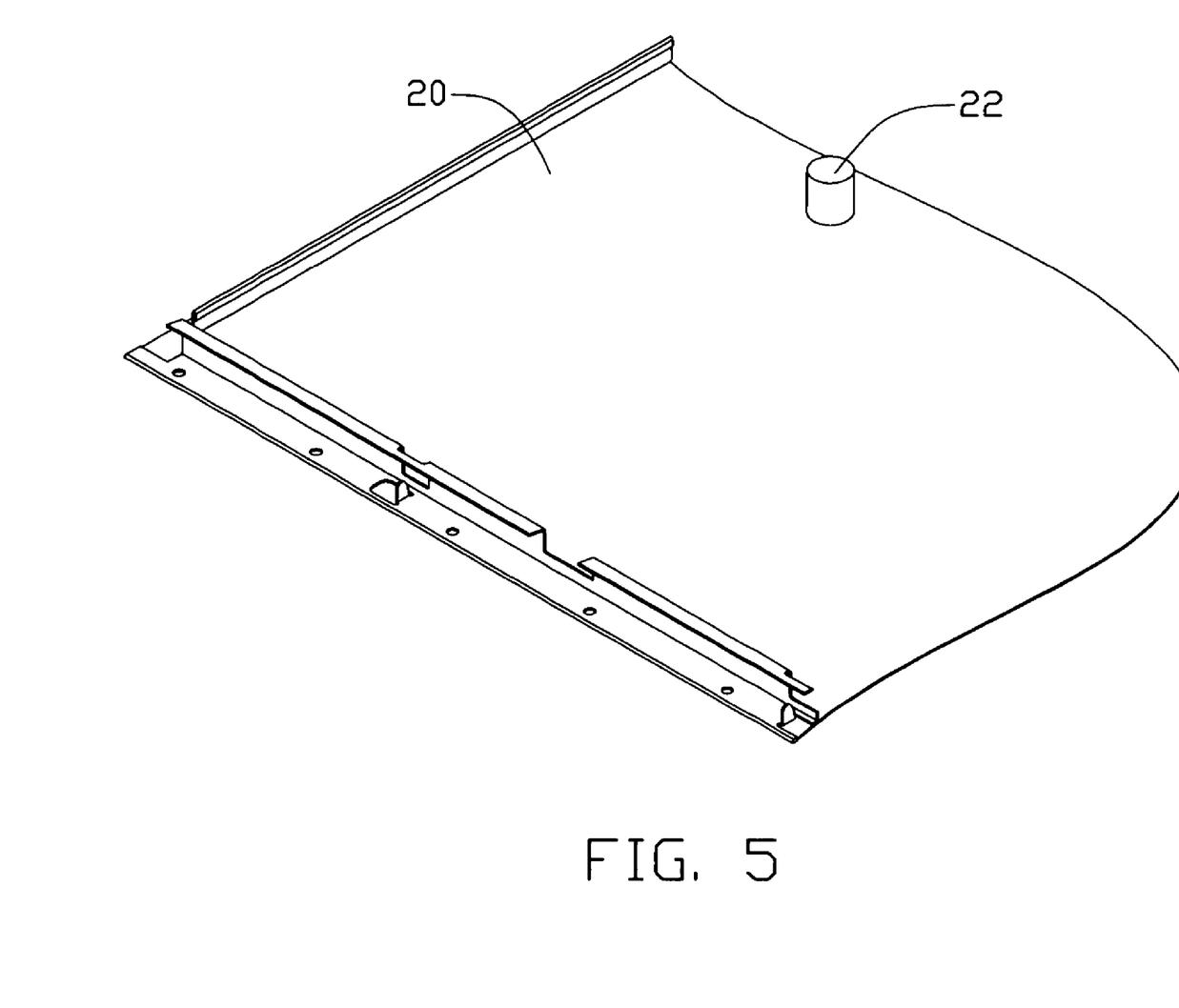
FIG. 5 is an enlarged, isometric view of the cover of FIG. 1, but viewed from an inverted aspect.

Referring also to FIG. 5, the cover 20 includes a post 22 extending from a lower surface thereof, for abutting the data storage device 60.

Figure 6:
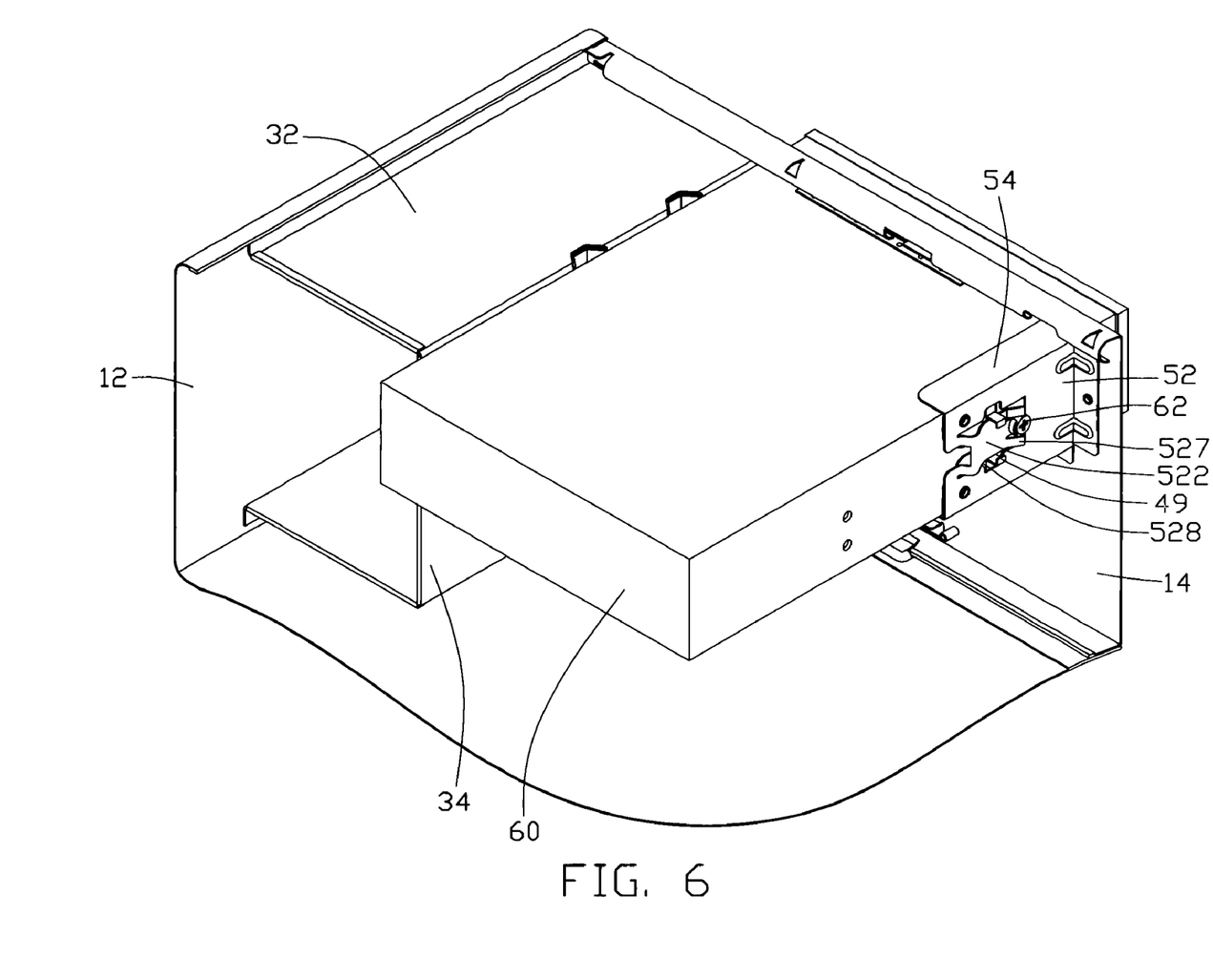
FIG. 6 is an assembled view of FIG. 1, without the cover attached to the chassis.

Referring also to FIG. 6, in assembly, the latch member 50 is attached to the first panel 14 of the case 10. The mounting flanges are fixed to the first panel 14 of the case 10 and the board 52 is fixed to the first plate 44, with the locating protrusions 442 engaging in the apertures 529 by conventional fastening means. The board 52 of the latch member 50 abuts the first plate 44 of the first panel 14, with the flanges 54 extending into upper and lower sides of the opening 42 of the first panel 14 and the lower flange 54 aligning with the second plate 46. The cutout 523 aligns with the entry 482 of the second sliding channel 48. The hooks 49 of the first plate 44 extend out of the locating slots 528 of the latch member 50 to engage with an outside surface of the resilient arm 522. The positioning space 526 aligns with a distal end of the second sliding channel 48.

Figure 7:
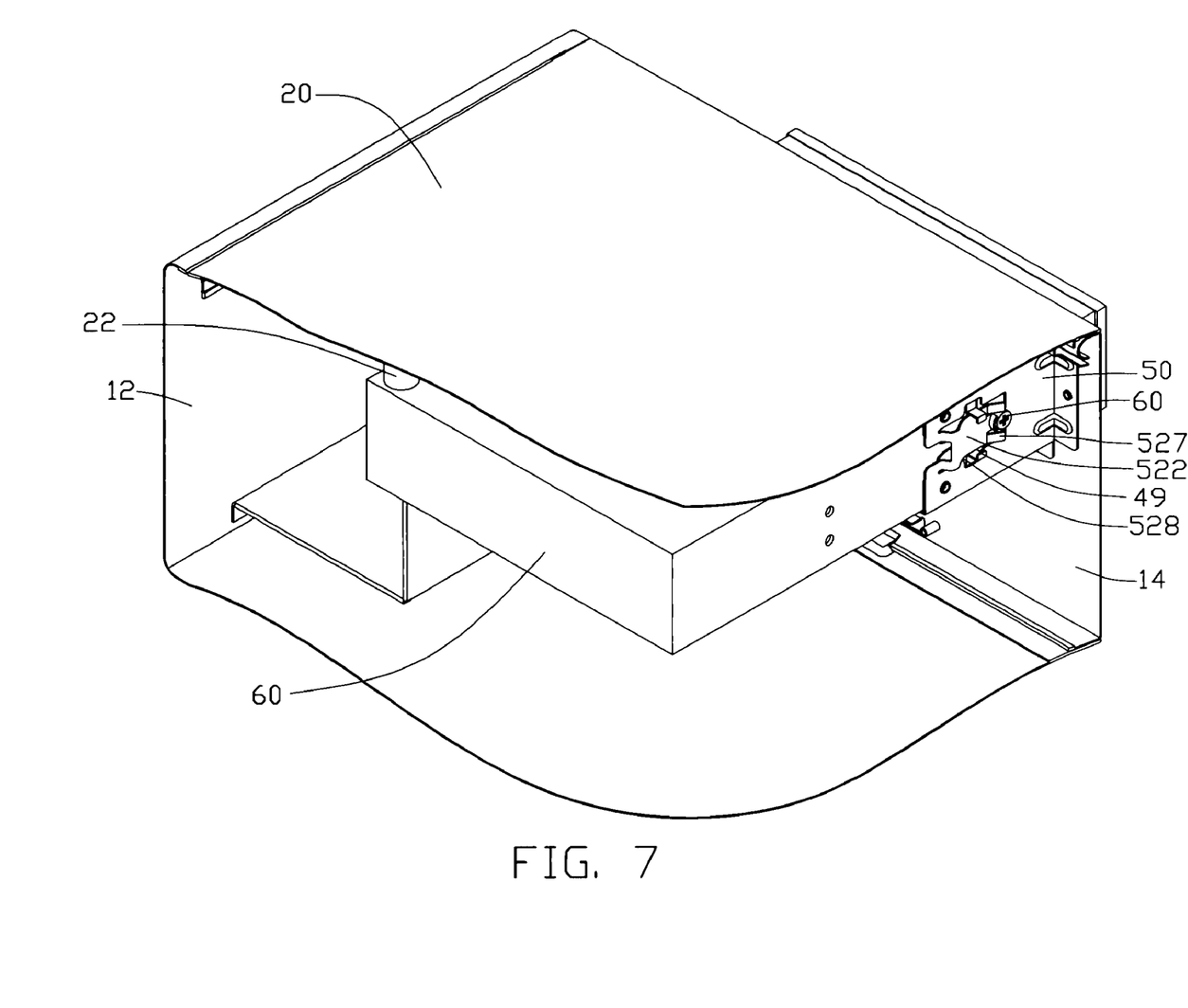
FIG. 7 is an assembled view of FIG. 1, with the cover attached to the chassis.

Referring also to FIG. 7, in use, the data storage device 60 is pushed into the case 10 from front to rear, with the neck portions 622 of the guiding pins 62 entering the entries 362 of the first sliding channels 36 and the entry 482 of the second sliding channel 48 respectively. The neck portions 622 of the guiding pins 62 slide in the straightaways 364 of the first sliding channels 36 and the straightaway 484 of the second sliding channel 48 respectively. The neck portions 622 of the corresponding guiding pins 62 ride over the projection 365 of the corresponding first sliding channel 36 to be located in the retention portions 366 of the first sliding channels 36. The head of the corresponding pin 62 attached at the right side of the data storage device 60 pushes the resilient arm 522 outward and then snappingly engages in the positioning space 526 of the latch member 50 to be prevented from moving in a first direction along the second sliding channel 48 or a second direction perpendicular to the second sliding channel 48. Thus, the data storage device 60 is fixed in the case 10 and exposed to outside via the opening 42. The projection 365 of the corresponding first sliding channel 36 prevents the data storage device 60 from sliding frontward. Then the cover 20 is attached to the case 10 to keep the neck portions 622 of the guiding pins 62 in the retention portions 366 of the first sliding channels 36, with the post 22 abutting a left-front corner of the data storage device 60.

To remove the data storage device 60 from the chassis 100, the cover 20 is detached from the case 10. The corresponding guiding pin 62 disengage from the positioning space 526 of the latch member 50, by urging the handling tabs 527 outward. The data storage device 60 is easily taken out of the case after the corresponding pin 62 passes the projection 365 of the first sliding channel 36.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. A computer enclosure comprising:
   a case comprising a panel defining an opening;
   a bracket located at one side of the panel and configured for holding a data storage device therein, the bracket defining a first sliding channel;
   a plate extending inward from the panel at an edge of the opening, the plate defining a second sliding channel, each of the first and second sliding channels comprising an entry formed at one end thereof away from the panel;
   a pair of guiding pins configured for attaching to opposite sidewalls of another data storage device and sliding into the first and second sliding channels via the entries thereof respectively to mount the another data storage device in the case with the bracket and the plate clamping the another data storage at opposite sides thereof;
   a latch attached to the plate, the latch defining a positioning space configured for positioning one corresponding guiding pin thereat to thereby hold the another data storage device in the case; and
   a cantilever resilient arm extending from the latch and deformable in a direction perpendicular to the first plate to release the guiding pin from the latch, the plate forming a pair of spaced hooks slidably clamping upper and lower sides of the resilient arm and engaging with an outside surface of the resilient arm opposite to the first plate to prevent the resilient arm from damaging deformation.

2. The computer enclosure as claimed in claim 1, wherein the latch comprises a board attached to the plate and the cantilever resilient arm extending from the board adjacent to the entry of the second sliding channel toward the panel, the positioning space being formed between a free end of the resilient arm and the board.

3. The computer enclosure as claimed in claim 2, wherein another plate extends inward from the panel at another edge of the opening between the bracket and the plate, and a cover is attached to the case configured for cooperating with the another plate to clamp the another data storage device at another opposite sides thereof.

4. The computer enclosure as claimed in claim 1, wherein the resilient arm comprises a semicircular cutout defined in a free distal end thereof, the latch comprises an extension tab extending toward the distal end of the resilient arm, a curved cutout is defined in an end portion of the extension tab, the semicircular cutout and the curved cutout cooperatively define a positioning space therebetween to locate a corresponding guiding pin therein for preventing movements of the corresponding guiding pin in a first direction along the corresponding sliding channel and a second direction perpendicular to the corresponding sliding channel.

5. The computer enclosure as claimed in claim 1, wherein the first sliding channel comprises a straightway directly connecting to the entry, and a projection formed at an edge of the straight way, the projection comprises a first slanting edge slantingly extending from the edge of the straightway, and a second slanting edge angled with the first slanting edge to block the other one corresponding guiding pin in the first guiding channel.

* * * * *

UNITED STATES PATENT AND TRADEMARK OFFICE
CERTIFICATE OF CORRECTION

PATENT NO.       : 7,663,873 B2                                                   Page 1 of 1
APPLICATION NO.  : 11/556194
DATED            : February 16, 2010
INVENTOR(S)      : Sam Waisum Lau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this

Thirtieth Day of November, 2010

David J. Kappos
*Director of the United States Patent and Trademark Office*